June 19, 1928.
O. GALAUP
1,673,976
SAFETY DEVICE FOR PREVENTING THE ESCAPE OF GAS
Filed June 25, 1923
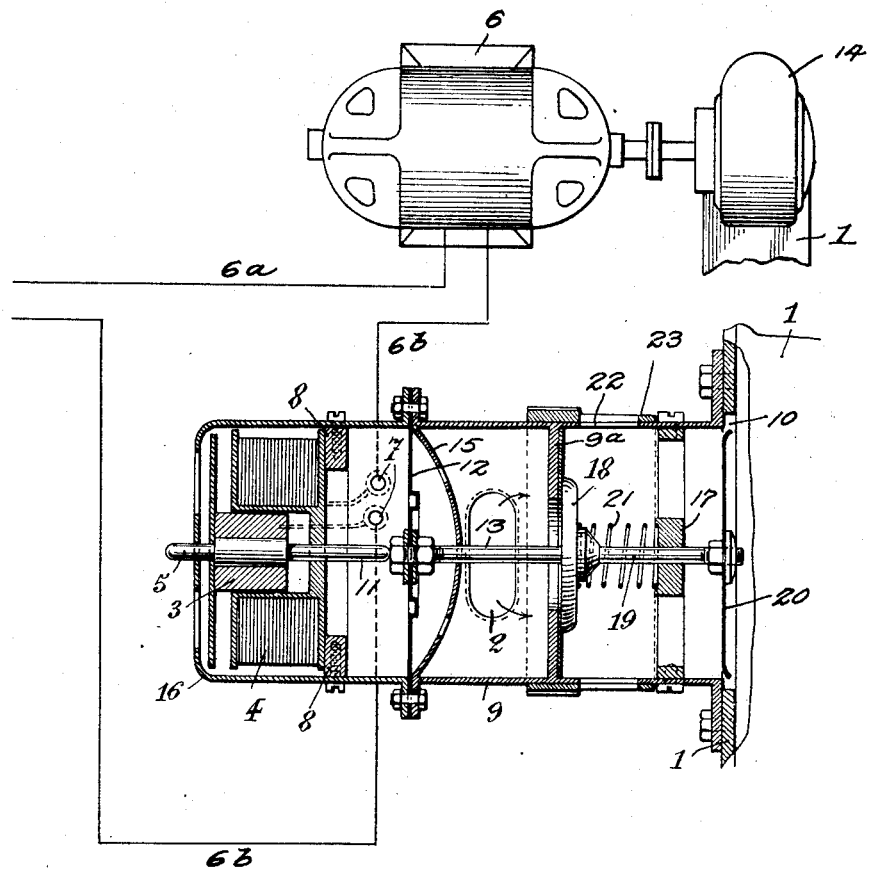
Witnesses:
Inventor:
OSCAR GALAUP.

Patented June 19, 1928.

1,673,976

UNITED STATES PATENT OFFICE.

OSCAR GALAUP, OF PARIS, FRANCE.

SAFETY DEVICE FOR PREVENTING THE ESCAPE OF GAS.

Application filed June 25, 1923, Serial No. 647,675, and in France July 4, 1922.

This invention relates to automatic valve devices for preventing escape of gas, on the stoppage of the fan inducing the supply and is of the type in which a spring closed inlet valve is provided adapted to be held in the open position, while the suction device, such as a fan driven by an electric motor is operating and being caused to close by its spring upon the voluntary or involuntary stopping of the suction device.

According to the present invention which relates to constructional improvements in devices of the type to which the invention relates, the valve stem projects on each side of the valve and at the outer extremity is connected to a corrugated spring diaphragm which forms one wall of a housing containing a solenoid and at the inner extremity carries a plate valve adapted in the closed position of the main valve to close the suction conduit.

The solenoid is suitably energized while the suction device is running and deenergized when the suction device stops for instance by connecting its windings with the windings of the electric motor driving the suction device.

The core of the solenoid is provided with a stem portion which comes in axial alignment with the stem of the valve.

When the suction has been interrupted upon a resumption of the suction the plate valve and the main valve move against the spring action and are retained open by the solenoid action.

In order that the invention may be better understood it will now be described with reference to the accompanying drawing, which shows a longitudinal section of the device as connected in practice.

In the drawing, 1 shows a fragment of a main supply pipe, which has mounted opposite an aperture 10 therein a tube 9, by means of a flange and bolts. The outer end of the tube 9 is also flanged and has bolted thereto a flanged housing 16 for a solenoid 4 which is carried by a ring disc 8. The solenoid comprises a core 3 having a stem portion 5 at the outer end and another stem portion 11 at the inner end. The stem 5 works freely through an aperture in the end of the housing 16, and the stem 11 through a central aperture in the solenoid frame. Between the flanges of the housings 9 and 16 the peripheral portion of a corrugated and flexible metal diaphragm 12 is clamped. The housing 9 carries an inwardly projecting flange 9ª to form a seating for a main valve 18, which has an outer stem portion 13 in axial alignment with the stem 11 of the solenoid and an inner stem portion 19. The end of the stem portion 13 is secured to the diaphragm 12 after passing through an aperture in a domed and apertured bearing plate 15. The stem 19 passes through a guide 17 and has secured thereto a plate valve 20 with a flared outer edge adapted to close or practically close the opening of the tube 9 into the main suction pipe 1, when the main valve 18 is closed. 21 is a compression spring around the stem 19 between the valve 18 and the guide 17. 2 is an inlet for gas in the housing 9 and 22 are inlets for air, the size of which is regulatable by an apertured ring 23, 22 and 23 forming a "hit and miss" regulator. A suitable motor 6 is coupled to a driving fan 14 which is disposed in the supply pipe 1. Said motor is connected to a suitable electrical source by means of conductors 6ª and 6ᵇ. Conductor 6ᵇ is broken and the terminals 7 of the solenoid are connected in series therewith.

In operation, starting with the parts in the position shewn on the drawing, when the suction device is started up a suction is produced in the main suction pipe 1. This acts on the plate valve 20 and simultaneously the core 3 of the solenoid is attracted causing the stem 11, which contacts with the end of the stem 13, to move the stem 13 to open the valve 18. The parts remain in this position during the maintenance of the suction but when the suction ceases voluntarily or involuntarily, then the spring 21 and the springiness of the diaphragm 12 which has been distorted by the previous movement of the stem 13 cause the valve 18 to be returned to its closed position and also at the same time return the moving parts of the solenoid device to the unenergized position.

I claim as my invention:

An automatic valve device for preventing escape of gas on the stoppage of a fan inducing the supply, comprising in combination a main suction pipe subject to the suction of the fan, with an opening therein, a tubular casing connected to said pipe through the opening, a flexible diaphragm closing the end of the tubular casing remote from the opening, a valve seating in said casing intermediate the ends, an entry for gas in the tubular casing on the side of the seating remote from the main suction pipe, an entry for air on the other side of the seating, a main valve adapted to take its seat on the said valve seating, a stem on one side of the valve and with its end connected to the flexible diaphragm, a stem on the other side of the valve, a guideway for said last mentioned stem, a compression spring between the guideway, and the main valve for pressing the main valve towards its seating, a plate valve on the end of this stem adapted in the closed position of the main valve to close the opening in the main suction conduit, a housing attached to the tubular casing beyond the flexible diaphragm, a solenoid in said housing, a core to the solenoid, a stem attached to the core and coming in axial alignment with the stem of the main valve attached to the diaphragm and connection to the windings of the solenoid for the purposes set forth.

In testimony whereof I affix my signature.

OSCAR GALAUP.